(12) United States Patent
Grund et al.

(10) Patent No.: US 9,156,717 B2
(45) Date of Patent: Oct. 13, 2015

(54) RADIAL PIPE REACTOR

(71) Applicants: Gerda Grund, Coesfeld (DE);
Johannes Chiovaro, Marl (DE);
Hartmut Rahtz, Duelmen (DE);
Karsten Hoeland, Bochum (DE)

(72) Inventors: Gerda Grund, Coesfeld (DE);
Johannes Chiovaro, Marl (DE);
Hartmut Rahtz, Duelmen (DE);
Karsten Hoeland, Bochum (DE)

(73) Assignee: Infracor GmbH, Marl (DE)

( * ) Notice: Subject to any disclaimer, the term of this patent is extended or adjusted under 35 U.S.C. 154(b) by 262 days.

(21) Appl. No.: 13/795,271

(22) Filed: Mar. 12, 2013

(65) Prior Publication Data

US 2014/0021141 A1    Jan. 23, 2014

Related U.S. Application Data

(60) Provisional application No. 61/674,022, filed on Jul. 20, 2012.

(51) Int. Cl.
| | | |
|---|---|---|
| *C02F 1/68* | (2006.01) | |
| *C02F 1/76* | (2006.01) | |
| *B01F 3/04* | (2006.01) | |
| *B01F 3/08* | (2006.01) | |
| *C01B 11/02* | (2006.01) | |

(52) U.S. Cl.
CPC . *C02F 1/76* (2013.01); *C02F 1/685* (2013.01); *B01F 3/0446* (2013.01); *B01F 3/0865* (2013.01); *B01F 2003/04907* (2013.01); *C01B 11/022* (2013.01)

(58) Field of Classification Search
CPC ............ C02F 1/686; C02F 1/76; C02F 1/763; C02F 2201/003; C02B 11/022; C02B 11/023; C02B 11/024; C02B 11/025; B01F 3/0446; B01F 3/0865; B01F 2003/04907
See application file for complete search history.

(56) References Cited

U.S. PATENT DOCUMENTS

| | | | |
|---|---|---|---|
| 4,534,952 A | 8/1985 | Rapson et al. | |
| 6,051,135 A | 4/2000 | Lee et al. | |
| 2005/0244328 A1* | 11/2005 | Schmitz et al. | ............... 423/477 |
| 2010/0155341 A1* | 6/2010 | Duve | ............................ 210/756 |

FOREIGN PATENT DOCUMENTS

| | | |
|---|---|---|
| DE | 1 203 691 | 9/1959 |
| DE | 20 2004 005 755 U1 | 8/2004 |
| DE | 10 2010 027 908 A1 | 10/2011 |
| EP | 0 153 841 A2 | 9/1985 |
| IT | 0001351156 | 1/2009 |
| JP | 60-239304 A | 11/1985 |
| JP | 11-10164 A | 1/1999 |
| JP | 2003-260468 A | 9/2003 |
| JP | 2004-143004 A | 5/2004 |
| JP | 2005-319381 A | 11/2005 |

(Continued)

OTHER PUBLICATIONS

U.S. Appl. No. 14/351,377, filed Apr. 11, 2014, Grund, et al.

(Continued)

*Primary Examiner* — Lucas Stelling
(74) *Attorney, Agent, or Firm* — Oblon, McClelland, Maier & Neustadt, L.L.P.

(57) ABSTRACT

An arrangement for addition of chlorine dioxide to flowing water in a pipeline is provided. The reactants are reacted in a reaction chamber located in the flow of water and the chlorine dioxide is passed from the reaction chamber directly into the flowing water.

15 Claims, 7 Drawing Sheets

(56) References Cited

FOREIGN PATENT DOCUMENTS

| | | |
|---|---|---|
| JP | 2008-94662 A | 4/2008 |
| RU | 2 163 882 C2 | 4/2000 |
| RU | 45378 U2 | 4/2000 |
| WO | WO 2009/077160 A1 | 6/2009 |
| WO | WO 2009/077309 A1 | 6/2009 |

OTHER PUBLICATIONS

"Disinfectants", "Chlorine Industry", Series Chemical Industry, Scientific and Research Institute for Technical and Economic Research in Chemical Industry, Moscow 1986, ISSN 0203-7971, 3 pages (English translation only).

* cited by examiner

RADIAL PIPE REACTOR

CROSS REFERENCE TO RELATED APPLICATIONS

This application claims priority to U.S. Application No. 61/674,022, filed Jul. 20, 2012, the disclosure of which is incorporated herein by reference in its entirety.

BACKGROUND OF THE INVENTION

The present invention is directed to an arrangement for the addition of chlorine dioxide to a water-carrying pipeline.

Water for industrial and commercial may be treated so that it is disinfected thoroughly, and in a safe and an environmentally acceptable manner. Cooling or process waters offer ideal conditions for the multiplication of microorganisms. Slime-forming bacteria in particular form so-called biofilms, which are microbiological contaminations which, in cooling water lines, may severely disrupt heat transfer and cause corrosion.

Because of its activity against microorganisms, chlorine dioxide ($ClO_2$) can be a particularly efficient agent for water disinfection. It is active across a broad pH range and can be used not only to treat industrial waters such as cooling or process waters, in particular, but may also be used—subject to compliance with appropriately low concentration—in the beverage and food industries, in agriculture or in medical technology. A further field of application is in the paper industry, where chlorine dioxide is used to bleach pulp. Lastly, chlorine dioxide also serves for the disinfection of swimming pool water.

The commercial units typical to date for producing chlorine dioxide contain considerable quantities of chlorine dioxide, with all of the attendant risks in the operation of the generating units. The risk is due to the fact that chlorine dioxide is a highly toxic, explosive chemical, which even at low concentrations undergoes explosive decomposition and, in so doing, releases chlorine.

On account of its hazardous nature and low stability, $ClO_2$ is generally not transported or stored. Preferably, the $ClO_2$ is synthesized directly at the site of use, more particularly in the water that is to be treated. In this way, the problem of producing and handling toxic and explosive chlorine dioxide is minimized or eliminated. Accordingly, methods to generate $ClO_2$ in situ and supply it immediately to the water to be treated, without further temporary storage, are conventionally known. Methods for in situ $ClO_2$ generation are described in WO2009/077309, WO2009/077160A1, DE202004005755U1, US2005/0244328A1 and U.S. Pat. No. 4,534,952.

Conventionally, generation of chlorine dioxide ($ClO_2$) in situ is conducted by the chlorite/hydrochloric acid process, in which hydrochloric acid (HCl) is reacted with sodium chlorite ($NaClO_2$) to give $ClO_2$, water ($H_2O$) and sodium chloride (NaCl):

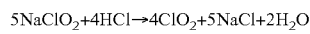

$5NaClO_2+4HCl\rightarrow 4ClO_2+5NaCl+2H_2O$

An advantage of this process is that there are only two reactants to be conveyed into the reactor, namely hydrochloric acid (HCl) and sodium chlorite ($NaClO_2$). Since both chemicals are in aqueous solution, the above technical problems are minimized; however, the corrosiveness of both solutions must be recognized. When mixed in a reactor, the two reactants undergo immediate and vigorous reaction to yield chlorine dioxide ($ClO_2$). The water ($H_2O$) of reaction that is formed, and the water constituents of the reactants supplied in aqueous form, wash the chlorine dioxide in highly concentrated aqueous solution from the reactor, where it becomes diluted with the water to be treated, attaining less hazardous but still biocidal concentrations. A disadvantage of this process is the inevitable formation of sodium chloride (NaCl), which if the solubility limit is exceeded, precipitates in crystalline form and clogs the reactor.

Reactors for the generation of chlorine dioxide in situ within the water to be treated are conventionally arranged within pipelines which carry the water to be treated. In one such arrangement, a reactor having a tubular reaction chamber, is extended essentially along the pipeline with the water to be treated, with the water flowing around the reactor. One example of an axial reactor of this kind is described in DE202004005755O1. Another example is described in DE102010027908A1. With these chlorine dioxide reactors, then, the tubular reaction chamber extends along the pipe and discharges the synthesized chlorine dioxide at the distal end of the reactor through an exit opening which is directed in the longitudinal direction of the pipe, in other words in the flow direction of the water to be treated. With axial pipe reactors of this kind, supplying the reactants is problematic and difficult.

U.S. Pat. No. 4,534,952 describes a pipe reactor for generating chlorine dioxide, which is arranged in a bend in the pipeline with the water to be treated. In the region where the product exits, the reaction chamber extends likewise axially in the flow direction. Since the shaft runs radially, so to speak, at least sectionally, in the region of the bend in the pipe, the supplying of the reactants into the reaction chamber is easier. A disadvantage of this embodiment is that there are sections of the reaction chamber where ambient air, rather than the water to be treated, flows around the reaction chamber, since the two reactants are mixed outside the pipeline. This means that in an accident scenario, toxic chlorine dioxide may be released. A construction of this kind is therefore inadvisable on safety grounds.

German published specification DE1203691 describes a chlorine dioxide synthesis reactor having as a reaction chamber, a dead water zone on the pipeline. Extending into the dead water zone are two open reactant lines via which the reactants are metered into the dead water for the purpose of synthesizing the chlorine dioxide. Within the dead water, the reactants undergo reaction to form chlorine dioxide, which exits from the dead water zone and is entrained by the drinking water to be treated, which flows through the pipeline. However, the arrangement of DE1203691 appears unfavourable from the standpoint of fluid dynamics. Moreover, there is a risk of the base of the dead water zone increasingly salting up. Lastly, the reactant lines run radially, unprotected, through the pipeline.

Therefore, the object of the present invention is to provide an arrangement having high operational reliability, safety and favourable fluid dynamics for the synthesis of chlorine dioxide in situ within a pipeline that carries the water to be treated.

SUMMARY OF THE INVENTION

This and other objects are obtained with the present invention, the first embodiment of which includes an arrangement for the addition of chlorine dioxide to a water-carrying pipeline, comprising: a pipe-line having a longitudinal axis carrying water; and a cylindrical shaft extending at least sectionally into the pipeline, directed radially to the pipe-line and having a reaction chamber at a distal end oriented such that the reaction chamber is within the pipeline; wherein within the cylindrical shaft are two separate reactant lines which run longitudinally through the shaft from outside the water pipeline into the reaction chamber, the reaction chamber comprises an exit hole having an axis, which in a service state is oriented in the direction of the longitudinal axis of the pipeline and in a flow direction of the water, and further wherein chlorine dioxide obtained by reaction of reactants in the reaction chamber passes through the exit hole into water in the pipeline.

In a preferred embodiment the axis of the exit hole in the service state is arranged coaxially with the longitudinal axis of the pipeline.

In another embodiment of the present invention, the reaction chamber is fastened detachably on the shaft, preferably fastened by a screw connection.

In another preferred embodiment the present invention includes a method to treat water, comprising: passing the water through a pipeline comprising at least one arrangement as described above; supplying reactants which react to yield chlorine dioxide separately through the reactant lines to the reaction chamber; reacting the reactants in the reaction chamber to obtain chlorine dioxide; and passing the chlorine dioxide to the water in the pipeline through the exit hole. In a preferred embodiment the reactants which react in the reaction chamber are sodium chlorite and hydrochloric acid.

In one highly preferred embodiment of the method a ratio M/Q of hourly generated mass of chlorine dioxide (M) in grams to a cross-sectional area (Q) of the exit hole in $mm^2$ is from greater than 30 $g/h/mm^2$ to less than 60 $g/h/mm^2$.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
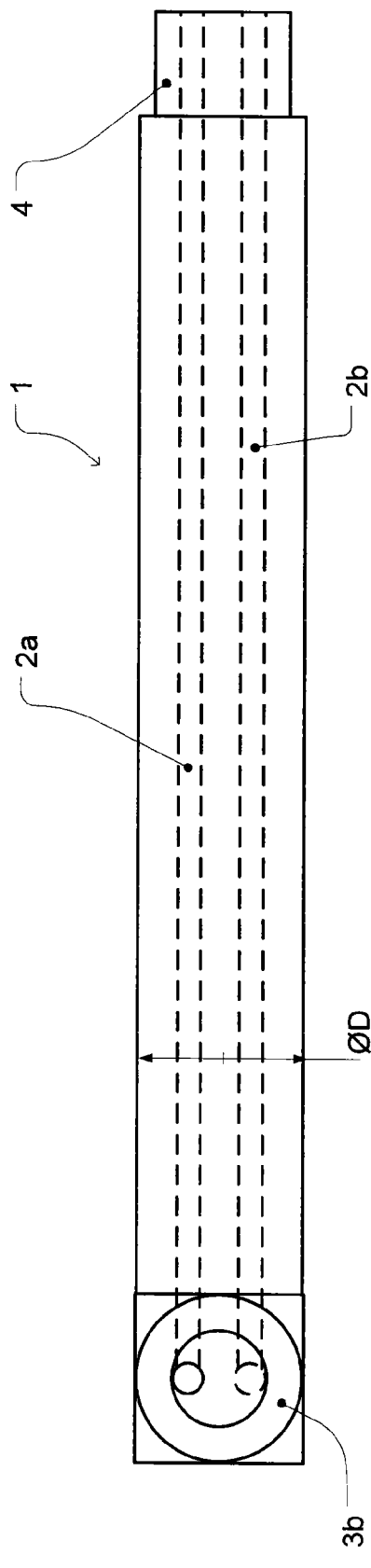
FIG. 1: shows a first embodiment of the shaft, in a side view.

Referring now to the drawings, wherein like reference numerals designate identical or corresponding parts throughout the several views.

In a first embodiment the present invention provides an arrangement for the addition of chlorine dioxide to a water-carrying pipeline, comprising: a pipe-line having a longitudinal axis carrying water; and a cylindrical shaft extending at least sectionally into the pipeline, directed radially to the pipe-line and having a reaction chamber at a distal end oriented such that the reaction chamber is within the pipeline; wherein within the cylindrical shaft are two separate reactant lines which run longitudinally through the shaft from outside the water pipeline into the reaction chamber, the reaction chamber comprises an exit hole having an axis, which in a service state is oriented in the direction of the longitudinal axis of the pipeline and in a flow direction of the water, and further wherein chlorine dioxide obtained by reaction of reactants in the reaction chamber passes through the exit hole into water in the pipeline.

The invention is therefore notable in particular for the shaft, which is arranged radially to the pipeline and which extends into said pipeline. Within the shaft there is no synthesis of chlorine dioxide; that synthesis takes place exclusively within the reaction chamber which is arranged at the distal end of the shaft. The shaft therefore initially fulfils the function of positioning the reaction chamber within the pipeline, so that in an accident scenario the chlorine dioxide is taken off in dilution by the water carried within the pipeline. Furthermore, the shaft surrounds the two reactant lines, so that the reactants may be conveyed separately from one another into the reaction chamber, only intermixing therein and reacting to form chlorine dioxide. With the arrangement according to the invention, therefore, the chlorine dioxide is always produced within the pipeline. By virtue of its cylindrical form, the shaft has a streamlined shape. Lastly, the shaft protects the reactant lines from damage, thereby further enhancing the safety of the unit.

In one preferred embodiment of the invention, the dimensions of shaft and reaction chamber are such that the axis of the exit hole in the service state extends coaxially with the longitudinal axis of the pipeline. This means that chlorine dioxide exits centrally in the pipeline and thus enables outstanding mixing with the water flowing within the pipeline.

In one preferred embodiment of the invention, the reaction chamber may be fastened detachably on the shaft, in particular with a screw connection. This permits the simple construction of a sequence of different arrangements with different performance classes, which will be elucidated in more detail in later paragraphs.

Preferably, the reaction chamber, like the shaft, possesses a cylindrical form, may be arranged coaxially with the shaft, and has the same outer diameter as the shaft; accordingly, with the reaction chamber mounted, the cylindrical form of the shaft is continued onto the distal end of the reaction chamber with no changes in cross section. This embodiment may result in low hydraulic resistance.

In one preferred embodiment, the reaction chamber not only has a cylindrical outer form but also encloses a cylindrical reaction volume which is in contact with the surroundings and accessible exclusively via the two reactant lines and via the exit hole, the two reactant lines opening at a distance from one another on the proximal end face of the reaction chamber, and the exit hole formed in the shell of the reaction chamber. The axis of the exit hole may be arranged perpendicularly to the axes of the outlets of the reactant lines, but not intersecting these axes.

This design of the reaction chamber results in outstanding intermixing of the reactants within the reaction chamber, and thus the reaction proceeds rapidly. The low residence times associated with this permit a small reaction volume, making the reactor less expensive and generating a reduced flow resistance.

The entire reaction volume enclosed by the reaction chamber may be conceptually divided transversely into a distal half and a proximal half and in one particularly preferred development, the exit hole may be arranged as close as possible to the outlets of the reactant lines, at least in the proximal half of the reaction volume.

As already mentioned, during the operation of a chlorine dioxide reactor according to the hydrochloric acid/chlorite process, there is, inherently, co-production of sodium chloride, which under amphorous operational conditions causes the reactor to salt up.

Surprisingly, when the hydrochloric acid/chlorite process is conducted in the arrangement in accordance with the invention, no salt deposits if the ratio of the hourly generated mass of chlorine dioxide (M) in grams to the cross section (Q) of the exit hole in mm$^2$ is from greater than 30 g/h/mm$^2$ to less than 60 g/h/mm$^2$. These values include all ranges and subranges therein, including 40 g/h/mm$^2$ to 50 g/h/mm$^2$. If the hole cross section Q is selected too small in relation to the production volume M (M/Q greater than 60 g/h/mm$^2$), the reaction chamber may be clogged. If, alternatively, the hole cross section is too large, i.e., M/Q is less than 30 g/h/mm$^2$, the water flowing through the pipeline washes out the reaction chamber and, in so doing, flushes out unreacted reactant. The conversion rate of the reaction and hence the efficient use of resources are diminished as a result.

As already mentioned, by combining a shaft with different screw-on reaction chambers, it is possible to set up a type series of arrangements according to the invention, this construction entailing a small number of parts. The invention accordingly further provides a type series comprising at least two arrangements according to the invention, with screw-connected reaction chambers, where the two arrangements have different reaction volumes and their shafts are identical.

Since within the type series it is then necessary only to vary the reaction volume and possibly the cross section of the exit hole as well—the reactant lines may be kept constant—it is appropriate to construct the type series on a uniform shaft, which to vary the conversion performance may be combined with different reaction chambers. In this way, the number of parts within the type series may be significantly reduced, thereby significantly lowering the production costs. A further possibility is to convert an existing reactor into a higher $ClO_2$ output level by changing over the reaction chamber.

The type series preferably has not just two arrangements in two performance levels, but instead a greater number of output stages, such as four or five, for example.

Additionally, the present invention includes a combination of a water-carrying line with the arrangement according to the invention, where the pipeline has a pipe section within which the pipeline runs linearly and on which the pipeline is provided with a dead water zone which extends radially relative to the pipe section, and into which the shaft of the arrangement may be introduced coaxially, such that the exit hole is located centrally in the pipe section and its axis is turned coaxially with the longitudinal axis of the pipe section. In this united construction of pipeline and reactor, there is no accumulation of salt at the product exit point, and the flow resistance of the shaft protruding into the pipeline, with the reaction chamber mounted, may be comparatively low.

Further provided by the invention is a method to treat water flowing in the pipeline with chlorine dioxide which has been synthesized from the reactants in the reaction chamber of the arrangement. The chlorine dioxide may be synthesized more particularly by the sodium chlorite/hydrochloric acid process. The treatment is preferably a biocidal treatment, in other words the killing of microorganisms living in the water, with $ClO_2$. Microorganisms according to the present invention include, in particular, bacteria, viruses, fungi, germs, spores, algae or microbes. The killing of the microorganisms, in other words the disinfection of the water, is untaken from an industrial motivation in the case, for example, of the treatment of cooling waters, or alternatively on medical or veterinary grounds, as in the case of the treatment of drinking water or wash water in the case of interventions in the animal or human body.

FIG. 1 shows the side view of a first embodiment of the shaft 1. The shaft 1 essentially comprises a solid cylinder of PTFE in which two reactant lines 2a, 2b have been made in the longitudinal direction. The reactant lines 2a, 2b extend over almost the entire length of the shaft 1, from its proximal end to its distal end. Over almost its entire length, the shaft 1 has a cylindrical form with an outer diameter D. Only at its proximal end is the shaft 1 designed with a hammerhead shape, and at that point it possesses two coupling sleeves 3a, 3b, with one of the two reactant lines 2a, 2b opening out into each of these sleeves. The purpose of the coupling sleeves 3a, 3b is to be connected to metering pumps, not shown, via which the reactants for synthesizing the chlorine dioxide are conveyed into the arrangement. If the arrangement is operated according to the hydrochloric acid/chlorite process, hydrochloric acid, for example, is conveyed into the shaft via the coupling sleeve 3a, while sodium chlorite is introduced via the coupling sleeve 3b. In the present example, the coupling sleeves 3a, 3b and the reactant lines 2a, 2b are completely identical in configuration, and consequently it is immaterial which reactant is connected to which coupling. All that is important is that at this point in time the two reactants do not intermix, but are instead conveyed separately from one another through the shaft 1 in the direction of its distal end. For this purpose, the two reactant lines 2a, 2b are arranged separately from one another in the shaft 1, and extend from the hammerhead at the proximal end, in parallel, to the distal end of the shaft 1, at which an external thread 4 has been applied. At the end of the external thread 4, the reactant lines 2a, 2b open out from the proximal end of the shaft 1. Where the arrangement is operated with a different chemistry, it may also be advantageous to provide different line cross sections, in turn necessitating exact coupling. In order to prevent incorrect coupling, it is advantageous to configure both lines identically and to select a simple chemistry.

Figure 2:
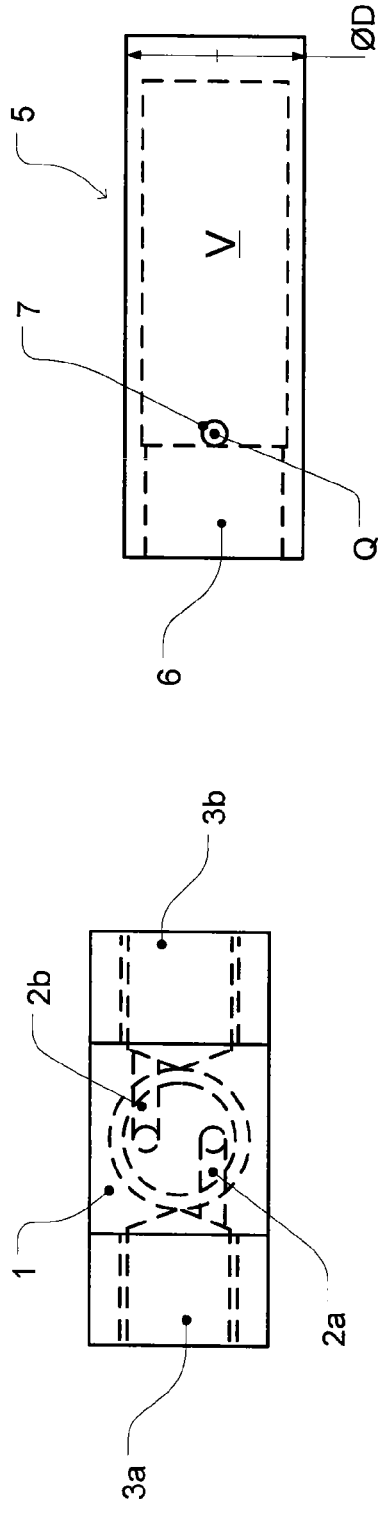
FIG. 2: shows a reaction chamber for a large conversion volume.
Figure 3:
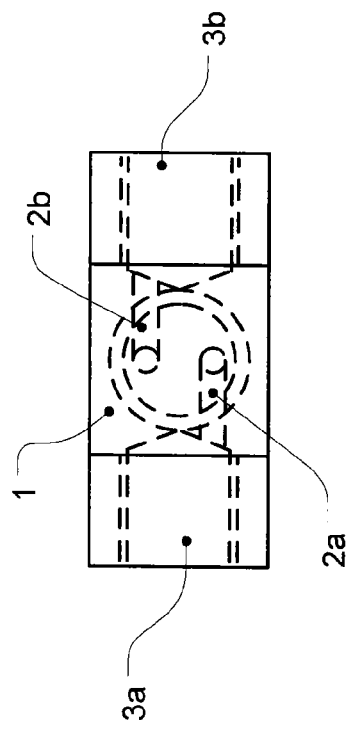
FIG. 3: shows the shaft from FIG. 1, in plan view.

The external thread 4 is provided for screw connection of the shaft 1 to the cylindrical reaction chamber 5 as shown in FIG. 2. For this purpose, the reaction chamber 5 may have an internal thread 6, by which it is screwed onto the external thread 4 of the shaft 1. Since the outer diameter D of the reaction chamber matches the shaft diameter D, there are no external cross-sectional changes at the transition between shaft and reaction chamber, which would give rise to eddies in the pipeline.

In the screwed-on state, the reaction chamber 5 encloses a reaction space, shown with dashed lines in drawing 2, with the reaction volume V. Immediately after the end of the internal thread 6, an exit hole 7 with cross section Q has been made in the shell of the reaction chamber 5. In the screwed-on state, the reaction volume V is in contact with the environment exclusively via the exit hole 7 and via the distal outlets of the two reactant lines 2a and 2b. In operation, the two reactants are passed into the reaction chamber 5 via the coupling sleeves 3a, 3b and along the reactant lines 2a and 2b, and do not intermix until they reach the chamber 5. The reaction of the products to form chlorine dioxide therefore takes place within the reaction volume V. The chlorine dioxide produced by reaction is displaced from the reaction volume V by the continued conveying of reactants, and exits the reaction chamber through the hole 7. The dimensions of the reaction volume V may be such that the residence time of the reactants within the reaction chamber amounts to around 5 seconds.

Figure 4:
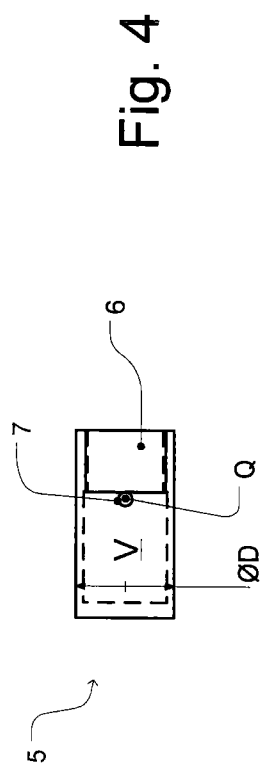
FIG. 4: shows a reaction chamber for smaller conversions.

FIG. 4 shows an alternative embodiment of the reaction chamber 5, which differs in its reaction volume V from the reaction chamber shown in FIG. 2. This difference may be achieved by the length of the reaction space being less and the internal diameter of the reaction chamber as well being smaller. The cross section Q of the hole 7 is greater than in the case of the embodiment in FIG. 2. Since, however, the diameter of the internal thread 6 of the reaction chamber 5 shown in FIG. 4 also matches the external thread 4 of the shaft 1 shown in FIG. 1, it is possible for the reaction chamber in FIG. 4 to be screwed onto the shaft of FIG. 1 without a discontinuity in diameter. As a result of reduction of the volume flow rates of the reactants conveyed in, a residence time of five seconds is again established; the formula which applies here is T=V/W, where T is the residence time, V for the reaction volume and W for the volume flow rate of the two reactants into the chamber. Since the reaction volume has been made smaller, the volume flow rates of reactants must be reduced accordingly in order to maintain the same residence time.

The result achieved through combination of the reaction chamber shown in FIG. 4 with the shaft shown in FIG. 1 is a reactor which has a much lower synthesis performance than the combination of the shaft from FIG. 1 with the chamber from FIG. 2. The combination from FIG. 1 and FIG. 2 is designed for a conversion rate of 2000 g of chlorine dioxide per hour, whereas the combination from FIG. 1 and FIG. 4 is designed for chlorine dioxide production of only 200 g per hour.

It is easy to see that by virtue of the screw connection 4, 6 between reaction chamber 5 and shaft 1, it is possible, using a small number of parts, to construct a sequence of reactors which cover different performance ranges. In practice, a greater number of performance stages may be provided than the two nominal sizes shown in the examples.

Figure 5:
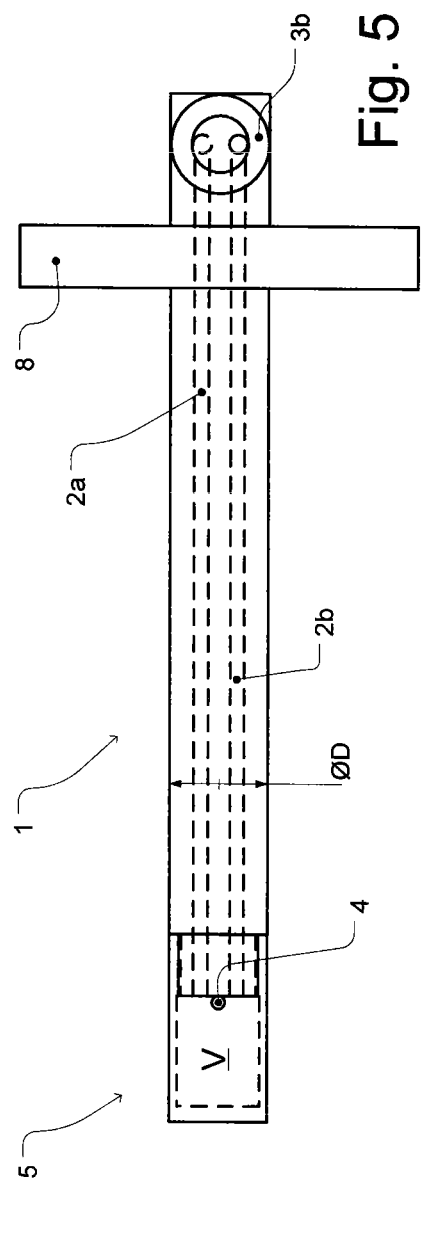
FIG. 5: shows a second shaft with flange and screwed-on reaction chamber.

FIG. 5 shows an alternative embodiment of the shaft 1, which is characterized by a flange 8 arranged beneath the coupling sleeves 3a, 3b. The flange 8 serves to fasten the shaft to a dead water zone on the pipeline, in which the water to be treated flows. This is elucidated again in detail in FIG. 6. The rest of the construction of the shaft 1 shown in FIG. 5 corresponds to that from FIG. 1. The external thread 4 has the same size as the shaft in FIG. 1, and so it is possible to combine both reaction chambers from FIG. 2 and FIG. 4 with the shaft in FIG. 5. A difference relative to the first embodiment in FIG. 1 is that the shaft length is somewhat less. Different shaft lengths are necessary, however, to adapt the arrangement to different line cross sections of the water-carrying pipelines.

Figure 6:
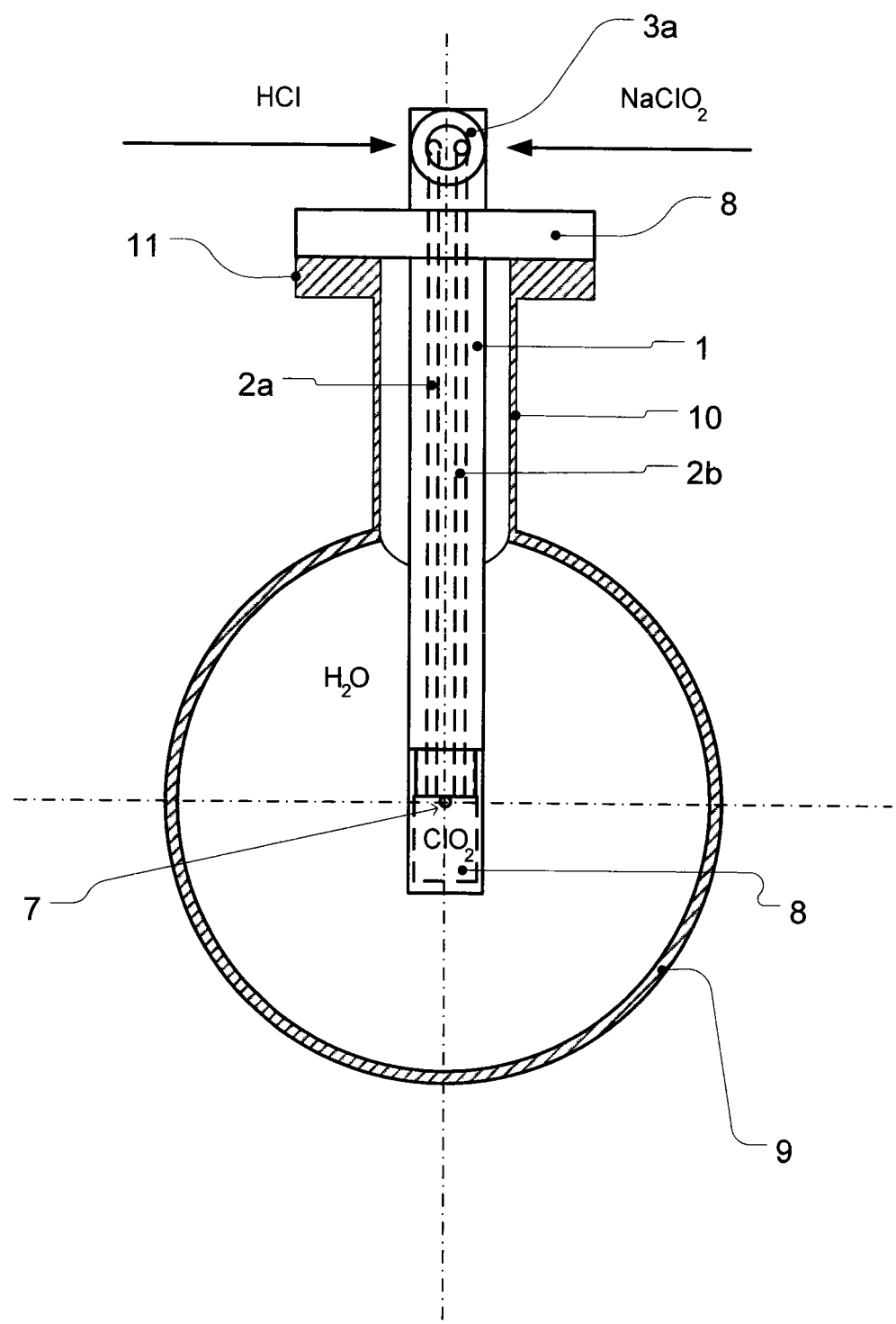
FIG. 6: shows a frontal installation scenario.

FIG. 6 shows the installation scenario of the arrangement of the invention. A pipeline 9 runs linearly, with no curvature, over the section shown. The flow direction of the water to be treated is therefore directed out of the plane of the drawing in FIG. 6, toward the viewer. Within the linear section shown, the pipeline 9 has a dead water zone 10 which extends continuously radially from the pipeline 9. The dead water zone 10 has a much smaller diameter than the diameter of the pipeline 9. With the reaction chamber 5 screwed on, the shaft 1 is inserted into the dead water zone 10. Fixing takes place via the flange 8, located on the shaft, to a corresponding mating flange 11 on the dead water zone 10. The flange screw connection necessary for this purpose is not shown. Inserted between the dead water zone 10 and the shaft 1 is a sealing element (likewise not shown), which prevents fluids escaping from the pipeline 9 or from the dead water zone 10 via the flange connection 8, 11. With the shaft inserted, the shaft 1, like the dead water zone 10, extends radially relative to the longitudinal axis of the pipeline 9. The dimensions of the shaft length and reaction chamber here are such that the exit hole 7 may be located at the level of the longitudinal axis of the pipeline 9. The chlorine dioxide flows out of the reaction chamber 5 in the flow direction of the water to be treated. The orientation of the axis of the exit hole 7 coaxially with the longitudinal axis of the pipeline 9 in accordance with the invention, downstream, has proved ideal. The radial orientation of the shaft 1 to the longitudinal axis of the pipeline, rotated by 90° relative to the previous orientation, and its cylindrical form, which continues via the reaction chamber 5, may be favourable from the standpoint of fluid dynamics.

In operation, one reactant may be conveyed into the shaft via each sleeve (3a shown, 3b facing away from the viewer in the section in FIG. 6, and therefore not visible) separately, and flows through the reactant lines 2a, 2b into the reaction chamber 5. Within the reaction volume V, the reactants undergo reaction to give chlorine dioxide and, after a residence time of about five seconds, they leave the reaction chamber 5 through the exit opening 7. The highly concentrated chlorine dioxide then intermixes quickly with the water $H_2O$ that is arriving in a high-volume flow in the pipeline and which is conveyed through the pipeline 9. Downstream, the water treated with chlorine dioxide has a certain concentration of $ClO_2$ that reliably kills microorganisms in the water $H_2O$.

The entire shaft 1 and the reaction chamber 5 are manufactured wholly from PTFE. Both parts are turned or milled from the solid material.

Table 1 shows technical data for three embodiments of the arrangement in different performance classes, including the structural dimensions and operational parameters necessary for maintaining the short residence time.

TABLE 1

Structural sizes and operating data within a construction series

| Structural size | | I | II | III |
|---|---|---|---|---|
| Maximum $ClO_2$ generation capacity M | (g/h) | 400 | 900 | 2000 |
| Volume flow rate HCl | (l/h) | 2.24 | 5 | 11.2 |
| Volume flow rate $NaClO_2$ | (l/h) | 2.24 | 5 | 11.2 |
| Concentration HCl | (%) | 30 | 30 | 30 |
| Concentration $NaClO_2$ | (%) | 25 | 25 | 25 |
| Molar ratio HCl:$NaClO_2$ | (—) | 2.4 to 3.4 | 2.4 to 3.4 | 2.4 to 3.4 |
| Reactor pressure/water pressure difference | (bar) | 6 | 6 | 6 |
| Maximum pressure of system | (bar) | 9 | 9 | 9 |
| Water temperature | (°C.) | 5 to 40 | 5 to 40 | 5 to 40 |
| Reactant lines diameter | (mm) | 4.5 | 4.5 | 4.5 |
| Internal diameter of reaction chamber | (mm) | 20 | 27 | 26 |
| Length of reaction chamber L | (mm) | 31 | 36 | 65 |
| Reaction volume V | (mm$^3$) | 9739 | 20 611 | 34 509 |
| Residence time | (s) | 7.83 | 7.42 | 5.55 |
| Exit hole diameter | (mm) | 4 | 4.5 | 7.5 |
| Cross section of hole for product exit Q | (mm$^2$) | 12.57 | 15.90 | 44.18 |
| Ratio M/Q | (g/h/mm$^2$) | 32 | 57 | 45 |
| Outer diameter of reaction chamber K | (mm) | 25 | 32 | 32 |

Having generally described this invention, a further understanding can be obtained by reference to certain specific examples which are provided herein for purposes of illustration only, and are not intended to be limiting unless otherwise specified.

EXAMPLES

Experiment 1

Effect of position of the product exit on the conversion rate

Figure 7A:
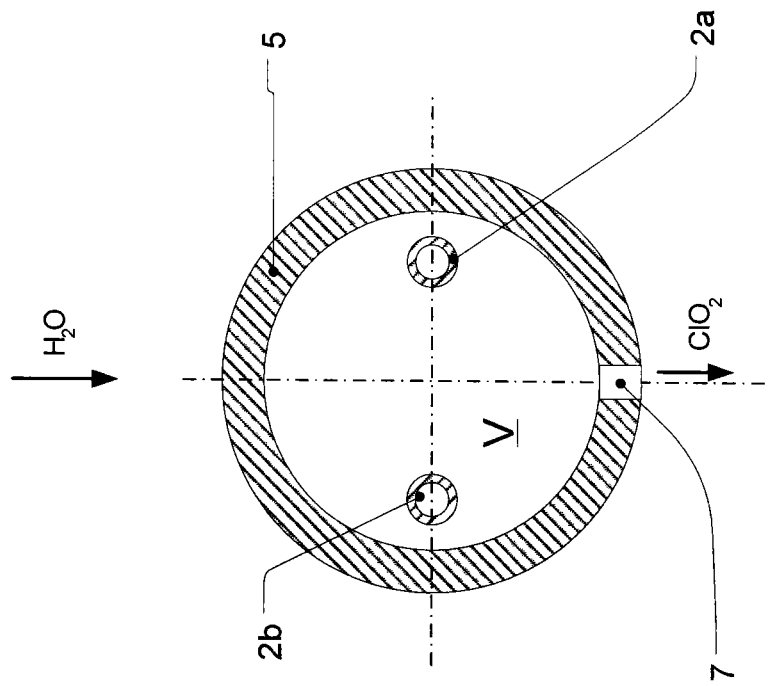
FIG. 7*a*: exit position 180° relative to the reactant lines.
Figure 7B:
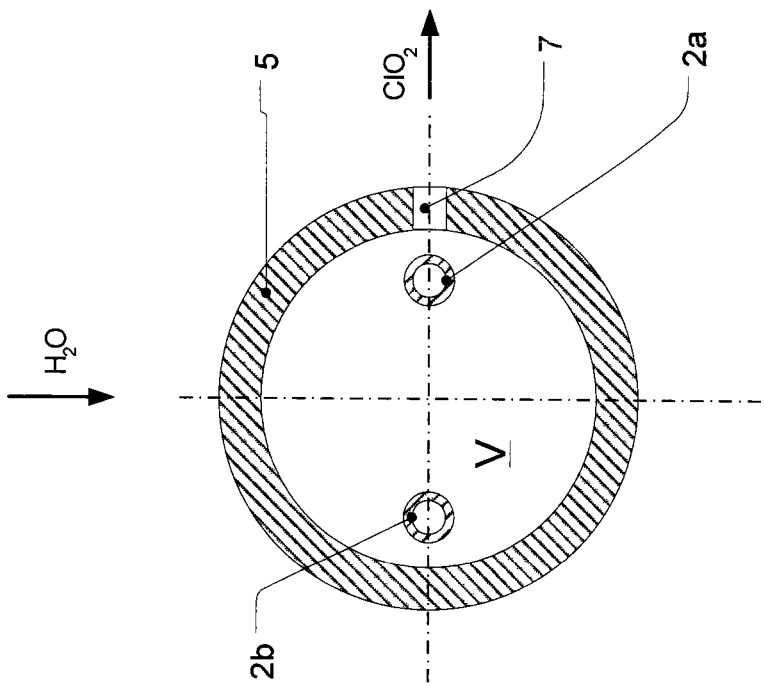
FIG. 7*b*: exit position 90° relative to the reactant lines.

In a series of experiments, a combination of pipeline and reactor as shown in FIG. 6 was investigated for the effect of the position of the hole (180° and 90°) on the conversion rate, with a hole diameter of 2 mm or 3 mm. In the case of the 180° position shown in FIG. 7a, the axis of the hole pointed in the direction of the longitudinal axis of the pipeline; with the 90° position in FIG. 7b, it was arranged transversely to the pipe axis. By rotating the reaction chamber, therefore, it was easily possible to compare the position of the exit opening at 180° (FIG. 7a) with a reactor according to the invention (90°, FIG. 7b). The results are shown in FIGS. 8 and 9.

TABLE 2

Figure 8:
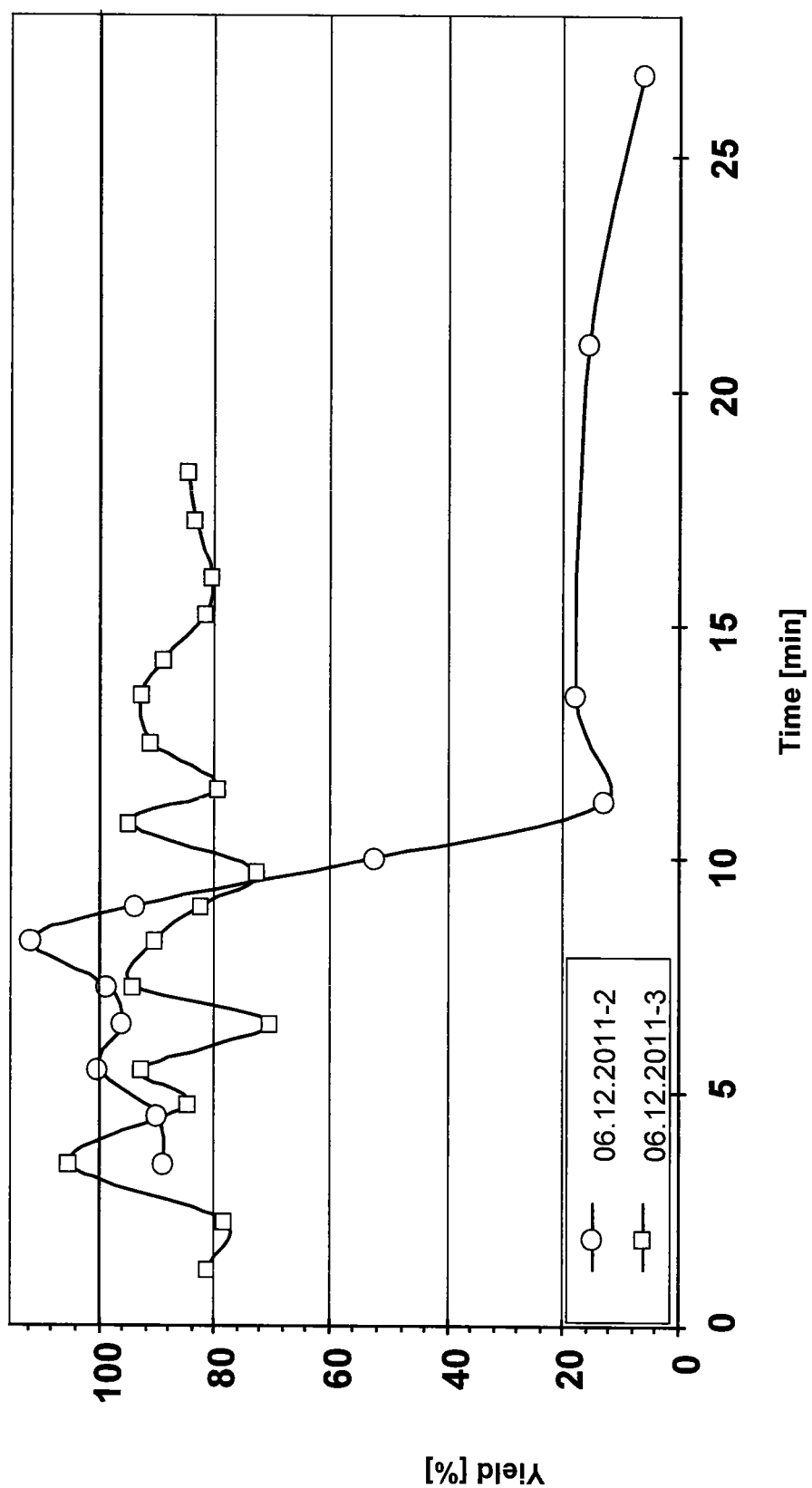
FIG. 8: effect of the 180° exit position on the conversion rate.
Figure 9:
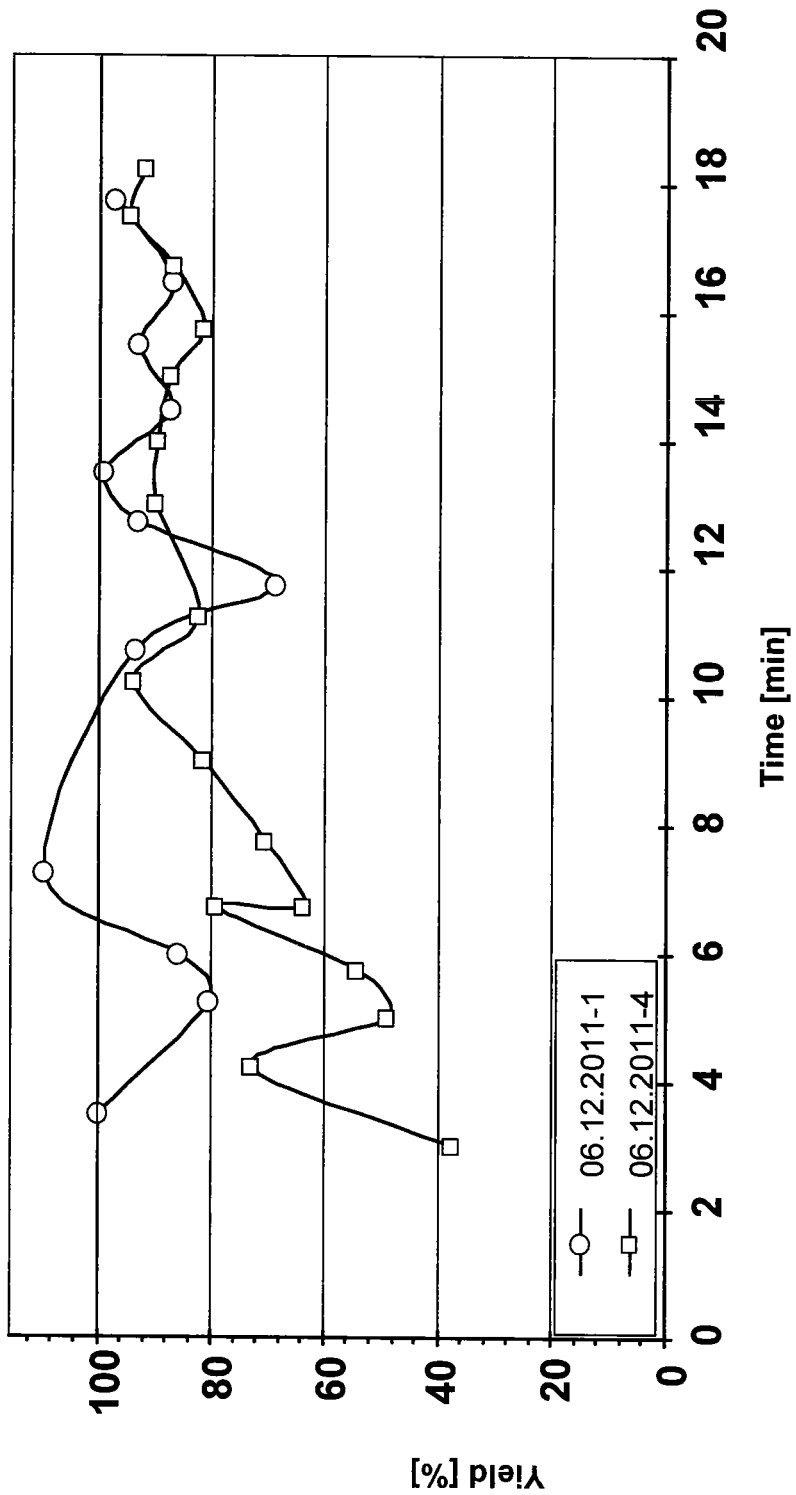
FIG. 9: effect of the 90° exit position on the conversion rate.

| Parameters of the experiments shown in FIG. 8 | | | | | | | |
|---|---|---|---|---|---|---|---|
| Experiment | Molar ratio (HCl:NaClO$_2$) | Residence time | | Ø Exit hole | Area of exit opening | Position of exit opening | Yield |
| 06.12.2011-2 | 3:1 | 5 sec. | 2x | 2 mm | 6.3 mm$^2$ | 180° | 97% |
| 06.12.2011-3 | 3.1:1 | 5 sec. | 2x | 3 mm | 14.1 mm$^2$ | 180° | 86% |

Experiment 06.12.2011-2 was carried out using 2 mm holes. The yield was approximately 100% before the conversion collapses completely and dropped even to below 20%. This is probably attributable to lumps of salt which blocked the two holes.

Experiment 06.12.2011-3 was carried out using 3 mm holes. The conversion yield fluctuates between about 75%-about 90%

TABLE 3

| Parameters of the experiments shown in FIG. 9 | | | | | | | |
|---|---|---|---|---|---|---|---|
| Experiment | Molar ratio (HCl:NaClO$_2$) | Residence time | | Ø Exit hole | Area of exit opening | Position of exit opening | Yield |
| 06.12.2011-1 | 3.1:1 | 5 sec. | 2x | 2 mm | 6.3 mm$^2$ | 90° | 91% |
| 06.12.2011-4 | 3.1:1 | 5 sec. | 2x | 3 mm | 14.1 mm$^2$ | 90° | 77% |

Experiment 06.12.2011-1 was carried out using 2 mm holes. The yield fluctuated between about 80% to 100%.

Experiment 06.12.2011-4 was carried out using 3 mm holes. The yield climbs with fluctuation from about 40% to about 90%.

From the results it can be concluded that where possible the position of the exit opening should be made at 900, i.e. transverse to the longitudinal axis of the pipeline, since higher and more stable conversion rates can be expected.

Experiment 2

Effect of the Hole Diameter on the Conversion Rate

The intention was to investigate whether the size of the diameter of the hole for product exit in the arrangement shown in FIG. 6 had an effect on the conversion rate. The background to this is that a larger hole diameter correlates with the possibility of more effectively dissipating any possible pressure rise in the reactor interior and/or with the greater ease of flushing salt from the reactor interior if such salt is formed. The reactor used had a production capacity of 2000 g/h.

TABLE 4

Figure 10:
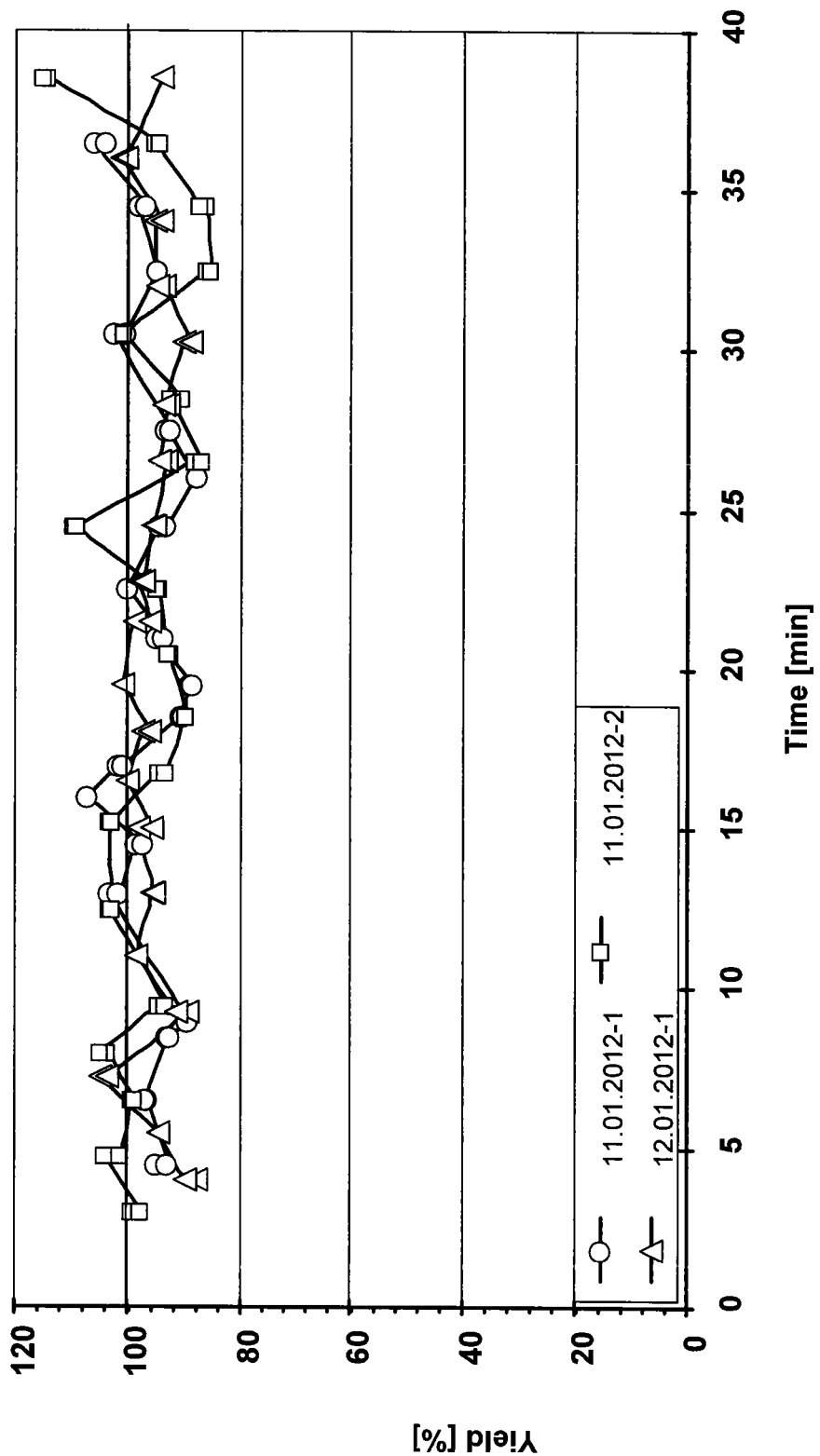
FIG. 10: effect of the size of the exit opening on the conversion rate.

Parameters of the experiments shown in FIG. 10

| Experiment | Molar ratio (HCl:NaClO$_2$) | Residence time | Ø Exit hole | | Area of exit opening | Position of exit opening | Yield |
|---|---|---|---|---|---|---|---|
| 11.01.2012-1 | 3.1:1 | 5 sec. | 1x | 4.5 mm | 15.9 mm$^2$ | 90° | 96% |
| 11.01.2012-2 | 2.9:1 | 5 sec. | 1x | 5.5 mm | 23.7 mm$^2$ | 90° | 97% |
| 12.01.2012-1 | 2.7:1 | 5 sec. | 1x | 7 mm | 38.5 mm$^2$ | 90° | 96% |

In experiment 11.01.2012-1, the yield fluctuated between about 90% and about 100%.

In experiment 11.01.2012-2, the yield fluctuated between about 90% and about 100%.

In experiment 12.01.2012-1 the yield fluctuated between about 90% and about 100%.

With this experiment, the fluctuations were less strongly pronounced than in the previous two experiments.

Experiment 2 showed that small holes can become clogged by salt, that larger holes improve gas removal and hence the conversion rate, and that water, if holes are too large, may wash out and/or dilute the reactor contents, and that the conversion rate may collapse.

Experiment 3

The intention was to investigate the effect of the ratio of the cross-sectional area Q of the exit opening to the production performance M of the reactor, and whether this ratio is suitable as a design variable for a series with different reactor performance classes. For this purpose, conversion experiments were undertaken using different hole cross sections and different generational performances; the molar ratio of the reactants and the residence time, were not varied. The results are plotted in Table 5.

TABLE 5

Results of experiment on varying the Q/M ratio

| Experiment No. [—] | Generational performance M g/h | Molar ratio (HCl/NaClO$_2$) [—] | Residence time s | Number of holes [—] | Hole diameter mm | Exit area Q mm$^2$ | Ratio Q/M | Yield [%] |
|---|---|---|---|---|---|---|---|---|
| 11.07.2012-2 | 2000 | 2.8:1 | 5 | 1 | 9 | 63.6 | 31 | 92 |
| 11.07.2012-1 | 900 | 2.7:1 | 5 | 1 | 6 | 28.3 | 32 | 100 |
| 10.07.2012-1 | 400 | 2.7:1 | 5 | 1 | 4.5 | 15.9 | 25 | 89 |
| 21.12.2011-3 | 900 | 2.7:1 | 5 | 1 | 4.5 | 15.9 | 57 | 97 |
| 11.01.2012-2 | 2000 | 2.9:1 | 5 | 1 | 5.5 | 23.8 | 84 | 97 |
| 12.01.2012-1 | 2000 | 2.7:1 | 5 | 1 | 7 | 38.5 | 52 | 96 |
| 25.01.2012-1 | 2000 | 2.6:1 | 5 | 1 | 5 | 19.6 | 102 | 88 |
| 25.01.2012-2 | 2000 | 2.6:1 | 5 | 1 | 5 | 19.6 | 102 | 52 |
| 20.01.2012-1 | 2000 | 2.7:1 | 5 | 1 | 5 | 19.6 | 102 | 81 |
| 20.01.2012-2 | 2000 | 2.6:1 | 5 | 1 | 5 | 19.6 | 102 | 73 |
| 20.01.2012-3 | 2000 | 2.6:1 | 5 | 1 | 5 | 19.6 | 102 | 66 |
| 20.01.2012-4 | 2000 | 2.6:1 | 5 | 1 | 5 | 19.6 | 102 | 69 |
| 20.04.2012-1 | 2000 | 2.7:1 | 6 | 1 | 8 | 50.3 | 40 | 98 |

In the experiments set out in Table 5 it can be seen that high conversions above 90% are achieved more at a ratio of Q/M of between 30 and 60 than outside this range.

LIST OF REFERENCE CHARACTERS

1 shaft
2a first reactant line
2b second reactant line
3a first coupling sleeve (HCl)
3b second coupling sleeve (NaCl)
4 external thread
5 reaction chamber
6 internal thread
7 exit hole
8 flange
9 pipeline
10 dead water zone
11 meeting flange
D outer diameter of reaction chamber and shaft
M hourly generated mass of chlorine dioxide
Q cross section of exit hole
V reaction volume Obviously, numerous modifications and variations of the present invention are possible in light of the above teachings. It is therefore to be understood that within the scope of the appended claims, the invention may be practiced otherwise than as specifically described herein.

The invention claimed is:

1. An arrangement for the addition of chlorine dioxide to a water-carrying pipeline, comprising:
   a section of the pipeline having a longitudinal axis;
   a dead water zone extending radially from the pipeline section; and
   a cylindrical shaft passing through the dead water zone directed radially to the longitudinal axis of the pipe-line and extending at least to the longitudinal axis of the pipeline;
   wherein
   the cylindrical shaft comprises:
   a reaction chamber at a distal end oriented such that the reaction chamber is within the pipeline; and
   a solid proximal portion being a solid shaft defining two separate reactant supply lines to the reaction chamber;

the two separate reactant lines run longitudinally through the solid shaft from outside the water pipeline into the reaction chamber, and wherein the reaction chamber comprises an exit hole having an axis, which in a service state is oriented in the direction of the longitudinal axis of the pipeline and in a flow direction of the water, and chlorine dioxide obtained by reaction of reactants in the reaction chamber passes through the exit hole into water in the pipeline.

2. The arrangement according to claim 1, wherein the axis of the exit hole in the service state is coaxial with the longitudinal axis of the pipeline.

3. The arrangement according to claim 1, wherein the reaction chamber is fastened detachably on the shaft.

4. The arrangement according to claim 3, wherein the reaction chamber is fastened to the shaft by a screw connection.

5. The arrangement according to claim 1, wherein the reaction chamber and shaft are oriented coaxially with one another, and an outer diameter of the reaction chamber is equal to an outer diameter of the shaft.

6. The arrangement according to claim 5, wherein a cylindrical reaction volume of the reaction chamber is accessible exclusively via the two reactant lines and via the exit hole, the two reactant lines open in the reaction chamber at a distance from one another on the proximal end face of the reaction chamber, and the exit hole is in the shell of the reaction chamber, with the axis of the exit hole arranged perpendicularly to axes of the outlets of the reactant lines, but not intersecting the axes of the outlets.

7. The arrangement according to claim 6, wherein when the reaction volume is divided transversely into a distal half and a proximal half relative to the shaft, the exit hole is located in the proximal half of the reaction volume.

8. The arrangement according to claim 1, wherein a ratio M/Q of hourly generated mass of chlorine dioxide (M) in grams to a cross-sectional area (Q) of the exit hole in $mm^2$ is from greater than 30 $g/h/mm^2$ to less than 60 $g/h/mm^2$.

9. The arrangement according to claim 3, comprising a series of different detachably fastened reaction chambers which attach to the same shaft; wherein the reaction volume of each of the different reaction chambers.

10. A water-carrying pipeline, comprising the arrangement according to claim 1 wherein the shaft of the arrangement is coaxial to the pipeline, and such that the exit hole is located centrally in the pipeline and axis of the exit hole is arranged coaxially with the longitudinal axis of the pipeline.

11. A method to treat water in the pipeline according to claim 10, comprising:

supplying reactants which react to yield chlorine dioxide separately through the reactant lines to the reaction chamber;

reacting the reactants in the reaction chamber to obtain chlorine dioxide; and passing the chlorine dioxide to the water in the pipeline through the exit hole.

12. The method according to claim 11, wherein the reactants which react in the reaction chamber are sodium chlorite and hydrochloric acid.

13. The method according to claim 11, wherein a ratio M/Q of hourly generated mass of chlorine dioxide (M) in grams to a cross-sectional area (Q) of the exit hole in $mm^2$ is from greater than 30 $g/h/mm^2$ to less than 60 $g/h/mm^2$.

14. The method according to claim 11, wherein microorganisms living in the water are killed by the treatment of the water.

15. The method according to claim 13, wherein M is adjusted to effect a microorganism kill.

* * * * *